UNITED STATES PATENT OFFICE.

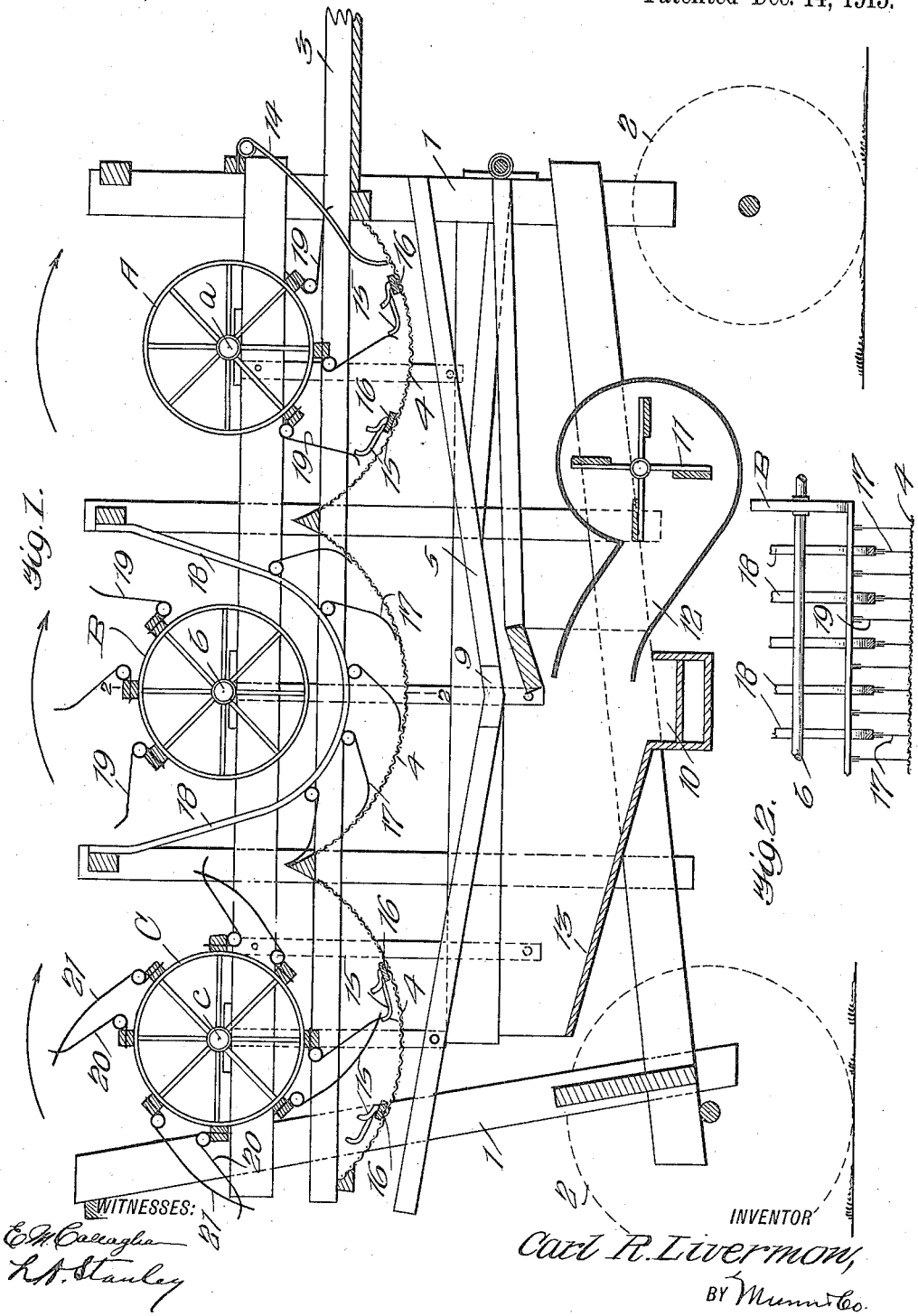

CARL R. LIVERMON, OF ROXOBEL, NORTH CAROLINA.

PEANUT-THRESHING MACHINE.

1,164,370. Specification of Letters Patent. Patented Dec. 14, 1915.

Original application filed March 17, 1914, Serial No. 825,268. Divided and this application filed April 26, 1915. Serial No. 23,841.

*To all whom it may concern:*

Be it known that I, CARL R. LIVERMON, a citizen of the United States, and a resident of Roxobel, in the county of Bertie and State of North Carolina, have invented certain new and useful Improvements in Peanut-Threshing Machines, of which the following is a specification.

My invention relates to improvements in peanut threshing machines, and it consists in the combinations, constructions, and arrangements herein described and claimed.

An object of my invention is to provide a device by means of which the peanuts may be stripped from the vines and delivered in a perfect condition.

A further object of my invention is to provide a device which will not tend to clog up, but in which the vines are so treated as to be kept from clogging up the machine and thereby delaying the operation of the device.

A further object of my invention is to provide a novel form of peanut threshing machine having means for tearing the vines to pieces and for positively pulling the peanuts off from the vines, thereby preventing the loss of peanuts.

Other objects and advantages will appear in the following specification and the novel features of the device will be particularly pointed out in the appended claims.

My invention is illustrated in the accompanying drawings forming part of this application in which:

Figure 1 is a longitudinal sectional view through the device, and Fig. 2 is a sectional view of a portion of the device.

This application is a division of a prior application, Serial Number 825268, filed March 17, 1914.

In carrying out my invention I provide a main frame 1 mounted on wheels 2. This frame bears a series of drums such as those shown at A, B, and C, which are mounted transversely on the frame upon their respective axles *a*, *b*, and *c*. Each of the drums is provided on its exterior with a series of spring fingers of the form set forth hereinafter.

At one end of the frame 1 is a table 3 upon which the peanut vines are placed preparatory to feeding them to the drums. Extending underneath the drums is a continuous screen 4, which forms a series of curves, each curve being concentric with the axis of its particular drum. Suspended from the frame 1 is a V-shaped chute 5 having a central opening 9 through which the peanuts may be delivered into a chute 10. A fan 11 is run by any convenient source of power and has a discharge pipe 12 which delivers a blast of air at right angles to the dropping peanuts so as to blow out any chaff or dirt through the air passage 13.

The device which is described thus far is ordinary. The particular features which are regarded as novel features of the invention are those which are described hereinafter.

Supported on the frame 1 adjacent to the table 3 is a series of spring fingers 14. These extend downwardly and terminate in curved ends which normally rest upon the screen 4. The screens underneath the drums A and C are provided with engaging members such as those shown at 15. It will be observed that these are fastened to cross members 16 and that they consist in reality of spring teeth. It will be noted that the teeth do not extend in radial lines, but that they are inclined substantially at 45° from the radial lines. Furthermore, each of the teeth has a portion which is substantially parallel with the bottom of the screen.

As will be seen from Fig. 1 the central screen portion underneath the drum B is normally engaged by a series of spring arms 17 which are carried by means of a curved bracket 18 secured to the frame 1.

The drums A and B are shown as provided with spring arms 19 which are mounted on the periphery of the drum. It will be understood that as many of these spring arms 19 may be employed as necessary without departing from the spirit of the invention.

The drum C is shown as being provided with spring arms 20 and 21, the former being similar to the arms 19 and the latter consisting of long springs which normally intermesh with the arms 20.

From the foregoing description of the various parts of the device, the operation thereof may be readily understood.

The peanut vines with the peanuts attached are fed into the machine from the table 3. The drums are revolved by any suitable means in the direction shown by the arrows. The teeth 19 of the drum A enter between the teeth 14 and engage the vines, pulling them down past the points of the spring arms 14 which tend to resist the movement, thus tearing off the peanuts free from the vines. The spring teeth 15 further resist the travel of the vines and tear the peanuts off, but these spring teeth also tear the vines up. That portion of the teeth 15 which is substantially parallel to the screen tends to keep the vines off from the bottom of the screen so as to give the peanuts a chance to fall through the screen upon the chute 5. Furthermore, it raises the vines into a position where the ends of the spring arms 19 can strip the peanuts from the bottom of the vines more readily. The upwardly turned ends of the spring teeth 15 tend to retard the travel of the vines and also to pull them to pieces.

As the vines are swept out of the first screen section by means of the spring arms 19 of the drum A, they are engaged by the spring arms 19 of the drum B. These spring arms 19 of the drum B pass between the spring arms 17 which act as retarding members for the vines, thus tending to give the teeth 19 a chance to strip the peanuts from the vines by providing a resisting force. As the vines pass from the drum B to the drum C, they are engaged by the double springs 20 and 21. The spring 20 tends to sweep the vines forwardly, while the springs 21 tend to hold the vines downwardly upon the spring teeth 15. This insures the final stripping of the peanuts from the vines, since it will be observed that while the spring arms 20 drive the vines forwardly, the spring teeth 15 tend to hold the vines back and to permit the arms 20 to strip the peanuts from them. At the same time the arms 21 prevent the vines from jumping the teeth 15.

The peanuts pass down the chute 5 through the opening 9 and fall into the delivery chute 10. During their passage from the chute 5 to the delivery chute 10, any chaff which has passed through the screen is blown out by the blower 11.

It will thus be seen that with a device as described, there is nothing that tends to injure the shells of the peanuts or to crush them, while at the same time providing a thoroughly effective method for pulling them from the vines.

I claim:—

1. In a peanut threshing device, a frame, a drum mounted therein, a series of spring arms carried by said drum, a screen disposed underneath said drum and concentric therewith, a stationary bracket carried by the frame, a series of spring arms carried by said stationary bracket and arranged to engage the upper surface of the screen, the spring arms of the drum being arranged to intermesh with the spring arms carried by said stationary bracket.

2. In a peanut threshing device, a frame, a drum mounted therein, a series of spring arms carried by said drum, said spring arms extending from the periphery of the drum at an angle to a normal to the drum, a screen disposed underneath said drum and concentric therewith, a stationary bracket carried by the frame, a series of spring arms carried by said stationary bracket and arranged to engage the upper surface of the screen, the spring arms of the drum being arranged to intermesh with the spring arms carried by said stationary bracket.

3. In a peanut threshing device, a frame, a drum mounted therein, a series of spring arms carried by said drum, said spring arms extending from the periphery of the drum at an angle to a normal to the drum, in a direction opposite to the direction of rotation of the drum, a screen disposed underneath said drum and concentric therewith, a stationary bracket carried by the frame, a series of spring arms carried by said stationary bracket and arranged to engage the upper surface of the screen, the spring arms of the drum being arranged to intermesh with the spring arms carried by said stationary bracket, and the last named arms extending in the direction of rotation of the drum.

CARL R. LIVERMON.

Witnesses:
J. M. Jacobs,
S. J. Fore.

Copies of this patent may be obtained for five cents each, by addressing the "Commissioner of Patents, Washington, D. C."